United States Patent
Stoimenov et al.

(10) Patent No.: US 6,892,176 B2
(45) Date of Patent: May 10, 2005

(54) HASH FUNCTION BASED TRANSCRIPTION DATABASE

(75) Inventors: Kirill Stoimenov, Santa Barbara, CA (US); Alexander Nikolov, Santa Barbara, CA (US)

(73) Assignee: Matsushita Electric Industrial Co., Ltd., Osaka (JP)

( * ) Notice: Subject to any disclaimer, the term of this patent is extended or adjusted under 35 U.S.C. 154(b) by 671 days.

(21) Appl. No.: 10/024,158

(22) Filed: Dec. 18, 2001

(65) Prior Publication Data

US 2003/0135369 A1 Jul. 17, 2003

(51) Int. Cl.[7] .......................... G10L 21/00; G10L 15/26
(52) U.S. Cl. ...................................... 704/255; 704/235
(58) Field of Search ............................ 704/231, 235, 704/255, 270–275

(56) References Cited

U.S. PATENT DOCUMENTS 5,500,920 A  *  3/1996  Kupiec .................... 704/270.1
5,870,706 A  *  2/1999  Alshawi .................... 704/255
6,374,226 B1 *  4/2002  Hunt et al. ................ 704/275
6,397,181 B1 *  5/2002  Li et al. .................... 704/256
6,411,932 B1 *  6/2002  Molnar et al. ............. 704/260

* cited by examiner

Primary Examiner—David D. Knepper
(74) Attorney, Agent, or Firm—Harness, Dickey & Pierce, PLC

(57) ABSTRACT

A hash function based data retrieval system for use with a lexicon database of a data processing system is disclosed. The system comprises a RAM, a disk memory, and a data file residing in the disk memory, wherein the data file contains stored data and is organized into nests. The system further comprises a hashing data structure residing in RAM, wherein the data structure is designed to occupy a fixed amount of memory independent of content of the data file. A data retrieval module is operable to identify a nest using a hash function that is based on parameters selected according to characteristics of the data file. The hash function is further designed to be optimized for content of the data file. The hash function is further designed to produce hash values based on the fixed amount of memory.

30 Claims, 4 Drawing Sheets

HASH FUNCTION BASED TRANSCRIPTION DATABASE

FIELD OF THE INVENTION

The present invention relates generally to speech recognition and synthesis systems and in particular to data retrieval systems and methods for use with a transcription database.

BACKGROUND OF THE INVENTION

Systems utilizing transcription databases suffer under the weight presented by the task of managing huge volumes of data. The sheer size of complete lexicons containing word strings with associated phonemes for transcription present many obstacles to successful access and management of the data. Some attempted solutions have implemented full-text scanning for matches in a large dictionary using hash functions. Others have implemented hashing techniques to identify candidates within a lexicon. Nevertheless, difficulties remain to be solved.

One such difficulty relates to the tradeoff regarding computational requirements of data access and management algorithms versus lexicon memory requirements. Specifically, memories operable with data processing systems that are capable of storing large amounts of data are typically very slow, whereas memories fast enough to readily accomplish search and sort algorithms are typically so small as to restrict the content of the lexicon. No solution has been presented for surmounting the obstacle thus presented. Thus, presenting a solution for surmounting this obstacle remains the task of the present invention.

SUMMARY OF THE INVENTION

In a first aspect, the present invention is a data retrieval system for use with a data processing system. The system comprises a first memory, a second memory accessible to said first memory, and a data file residing in the second memory. The data file contains stored data organized into nests. The system further comprises a data structure residing in the first memory. The data structure is designed to occupy a fixed amount of memory independent of content of the data file, and is organized according to hash values produced by a hash function for retrieving items in the data file. Thee hash values have associated offset values for accessing a nest of said data file. The system further comprises a data retrieval module in communication with the first memory. The data retrieval module is operable to instantiate the hash function, to calculate a hash value based on input data, and to make an identification regarding a corresponding nest of the data file via the data structure. The identification is based on the associated offset value of the hash value. The hash function is based on parameters selected according to characteristics of the data file, wherein the hash function is further designed to be optimized for content of the data file. The hash function is further designed to produce hash values based on the fixed amount of memory.

In a second aspect, the present invention is a method of constructing a data file for use with a data retrieval system of a data processing system, wherein the data processing system has a first memory and a second memory. The method comprises choosing a data structure size for a data structure based on a memory size of the first memory, and organizing the data file into a number of nests based on the data structure size. The method further comprises populating the data file with data based on a hash function and a plurality of parameters, and storing the plurality of parameters within the data file.

In a third aspect, the present invention is a method of retrieving stored data based on input data for use with a data retrieval system of a data processing system. The method comprises receiving input data, computing a hash value based on the input data, and determining an offset value based on the hash value. The offset value indicates a nest of a data file containing stored data, wherein the data file is organized into nests and resides in a second memory accessible to the data processing system. The method further comprises loading the nest from the second memory to a first memory accessible to said data processing system, searching the nest for matching stored data based on the input data, and retrieving the matching stored data.

In a fourth aspect, the present invention is a transcription database system for use with a computerized transcription system implemented via a data processing system. The system comprises a random access memory accessible to the data processing system, a disk memory accessible to the data processing system, and a lexicon file residing in the disk memory. The lexicon file contains compressed data corresponding to phoneme combinations for transcribing words of type string into audible speech, wherein the phoneme combinations have associated words of type string. The lexicon file also contains a stored combination of parameters generated during manufacture of said lexicon file. The system further comprises a hash table residing in the random access memory, wherein the hash table has a hash table size based on a memory size of the random access memory. The hash table is organized according to hash values having associated offset values for accessing word nests of the lexicon file, wherein the lexicon file is organized into a number of word nests based on the hash table size. The system further comprises a data retrieval module in communication with the first memory, wherein the data retrieval module is operable to calculate a hash value for an input word of type string based on the stored combination of parameters, character combinations parsed from the input word, and a length of the input word. The data retrieval module is further operable to access a word nest of the lexicon file via the hash table, load the word nest into the random access memory, decompress the word nest, search the word nest for a word of type string matching the input word, and retrieve the phoneme combination associated with the word of type string.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

The following description of the preferred embodiment(s) is merely exemplary in nature and is in no way intended to limit the invention, its application, or uses.

Figure 1:
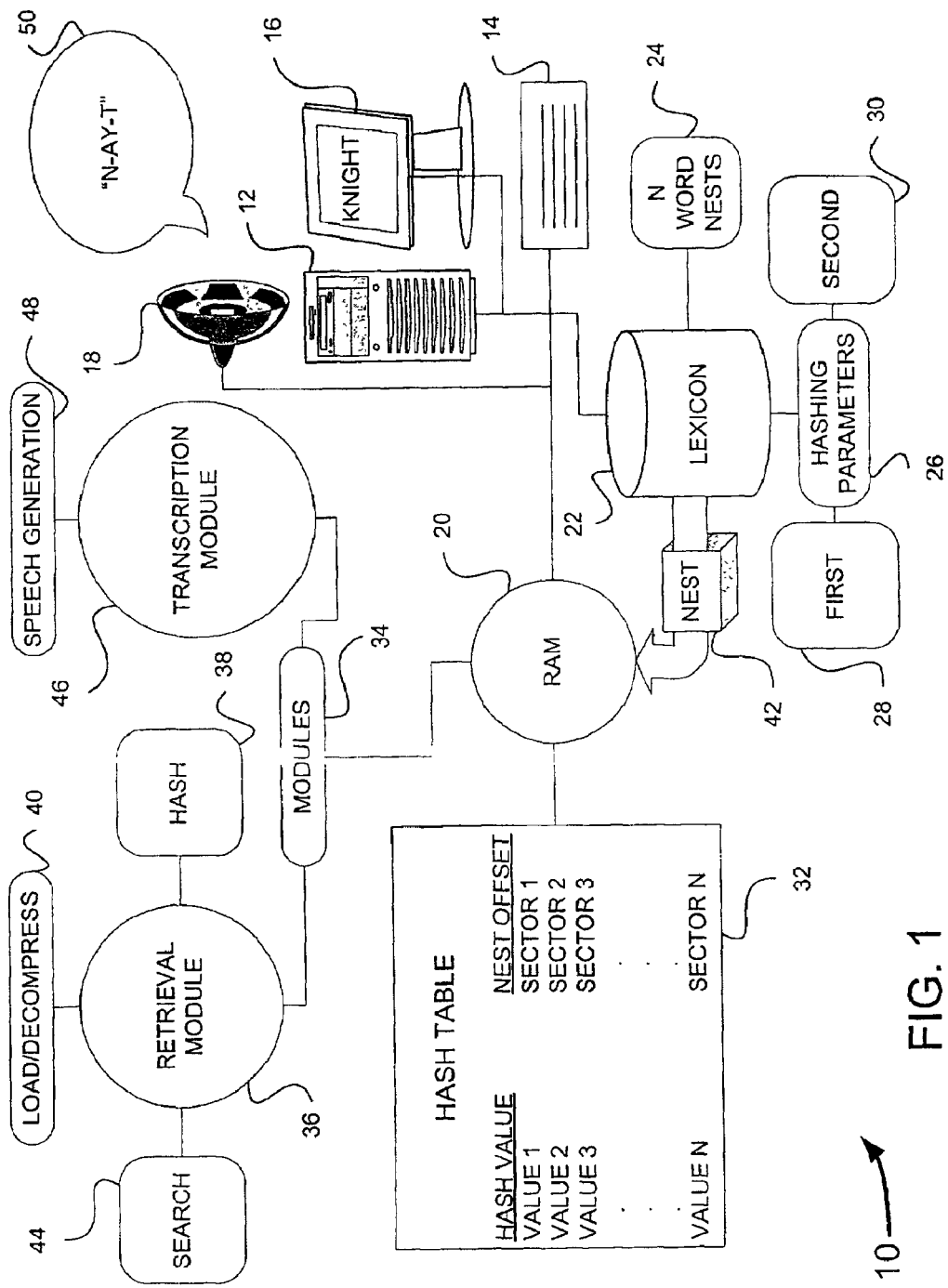
FIG. 1 is a diagram of an implementation of the present invention with a text to speech system.

Referring to FIG. 1, a text to speech system 10 is shown. A data processing system 12, having a keyboard 14, monitor 16, and speaker 18, further has a first memory 20 that is preferably a random access memory. Data processing system 12 also has a second memory 22 that is preferably a disk memory comprising a compressed data lexicon. The compressed data lexicon is organized into a plurality of word nests 24 corresponding to sectors of the disk. The compressed data lexicon also has stored hashing parameters 26 comprising a first parameter 28 and a second parameter 30. In one embodiment, first parameter 28 and second parameter 30 correspond to integers in a range from 1 to 256. As will readily be appreciated by one skilled in the art, possible combinations among these two integers number in excess of sixty-five thousand.

Residing in first memory 20 is data structure 32 corresponding to a hash table. Data structure 32 is organized into a plurality of hash values of a number equal to the number of word nests 24. Each hash value has an associated memory offset for accessing the corresponding nest of the compressed data lexicon.

In communication with first memory 20 are a plurality of modules 34. A retrieval module 36 of the plurality of modules 34 is operable to utilize hash function 38 to compute a hash value based on input data. In accord with implementation of the present invention with a text to speech system 10, a word of type string, such as "Knight," may be input to data processing system 12 via keyboard 14 and concurrently displayed on monitor 16. Utilizing hash function 38, retrieval module 36 computes a hash value for the input data and ascertains an appropriate nest offset via data structure 32. Further utilizing load/decompress function 40, retrieval module 36 loads corresponding word nest 42 from second memory 22 to first memory 20. Subsequently, retrieval module 36 further utilizes load/decompress function 40 to decompress corresponding word nest 42 in first memory 20. Still further, retrieval module 36 utilizes search function 44 to search the corresponding word nest 42 for stored data matching the input data.

As a result of data retrieved according the system and method of the present invention, text to speech system 10 may utilize transcription module 46 of plurality of modules 34 to accomplish transcription. Accordingly, transcription module 46 utilizes speech generation function 48 to produce speech 50 via speaker 18 according to the stored data corresponding to a phoneme combination "n-ay-t."

As may readily be appreciated by one skilled in the art, the plurality of word nests 24 may correspond to clusters rather than sectors of second memory 22. Similarly, a plurality of sectors or clusters for each word nest may be used. As will further be readily apparent to one skilled in the art, the system and method of the present invention is further applicable for use with speech recognition, and a word may be defined broadly with respect to the invention so as to encompass any meaningful information that may be stored in a computer memory.

Figure 2:
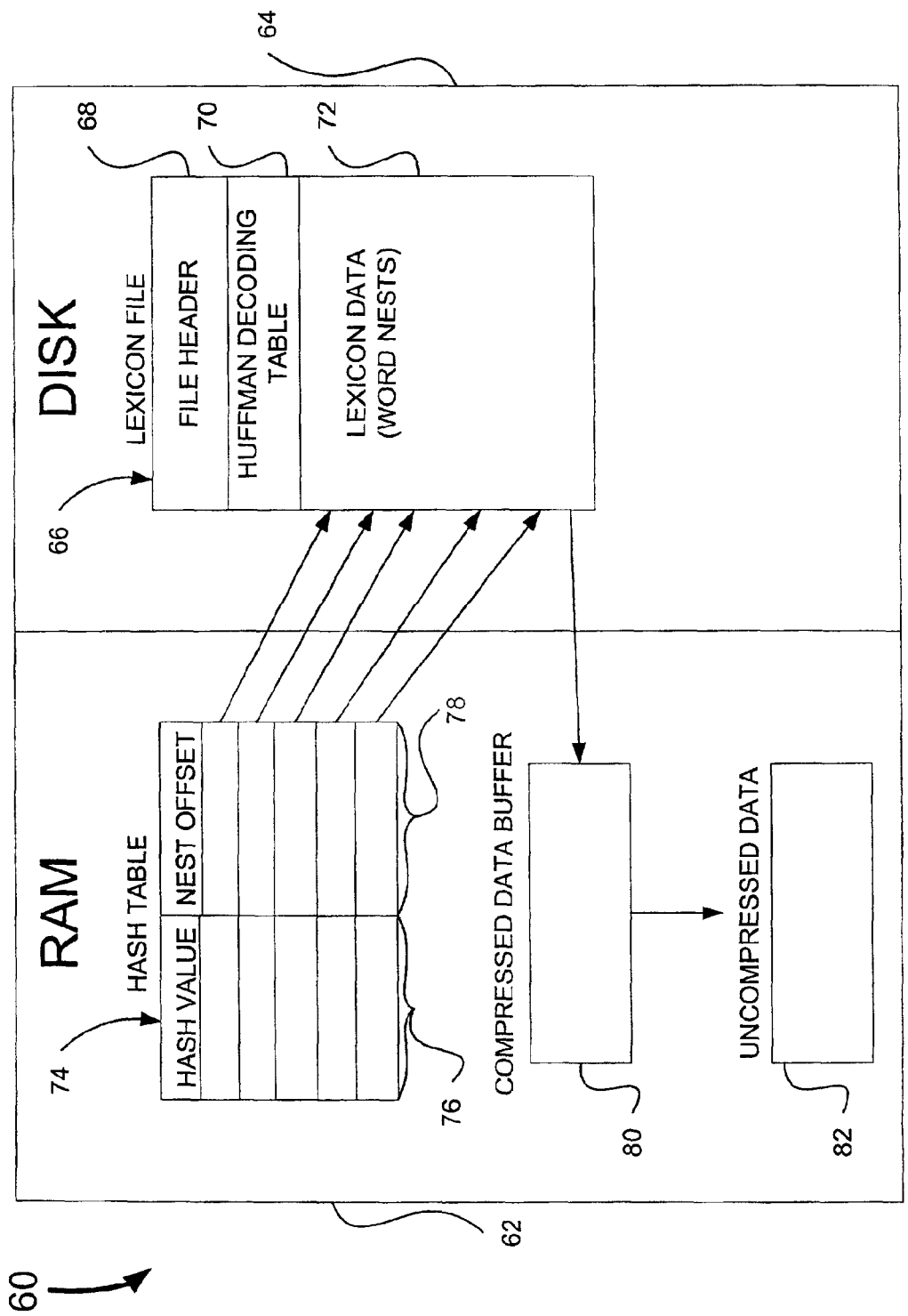
FIG. 2 is a block diagram of computer memory utilization consistent with the present invention.

Referring to FIG. 2, computer memory utilization consistent with the present invention is shown. A computer memory 60 is partitioned into first memory 62 and second memory 64. In a preferred embodiment, first memory 62 corresponds to random access memory, whereas second memory 64 corresponds to disk memory. Residing in second memory 64 is lexicon file 66 featuring file header 68, Huffman Decoding Table 70, and lexicon data 72, wherein lexicon data 62 is organized into word nests. As may readily be appreciated, the lexicon data 72 may be compressed, and compression is a form of encryption. The advantages associated with encrypting the contents of the file include protection of the information, protection of organization of the information, and the protection of the effort involved in generating, organizing, and compiling the information. Even where a standard compression/decompression algorithm is used, file contents are still protected, and even a small variation in one of these standard algorithms can greatly hinder efforts to copy the file contents. Such a variation may also ensure that a user must have the corresponding decompression algorithm to access and use the lexicon file, thus potentially preventing unauthorized use of the file in addition to preventing unauthorized copying of the file contents.

Residing in first memory 62 is hash table 74, organized into hash values 76, each having a nest offset 78. In accord with the system and method of the present invention, each nest offset 78 indicates a particular word nest of lexicon data 72. Thus, a word nest may be accessed via hash table 74 and loaded into first memory 62, as compressed data buffer 80. Accordingly, data present in compressed data buffer 80 is decompressed into uncompressed data 82 for search. As may readily be appreciated by one skilled in the art, in order for the system and method of the present invention to operate in a dependable manner, it is necessary to utilize the same hash function for both access and construction of the lexicon file 66.

Figure 3:
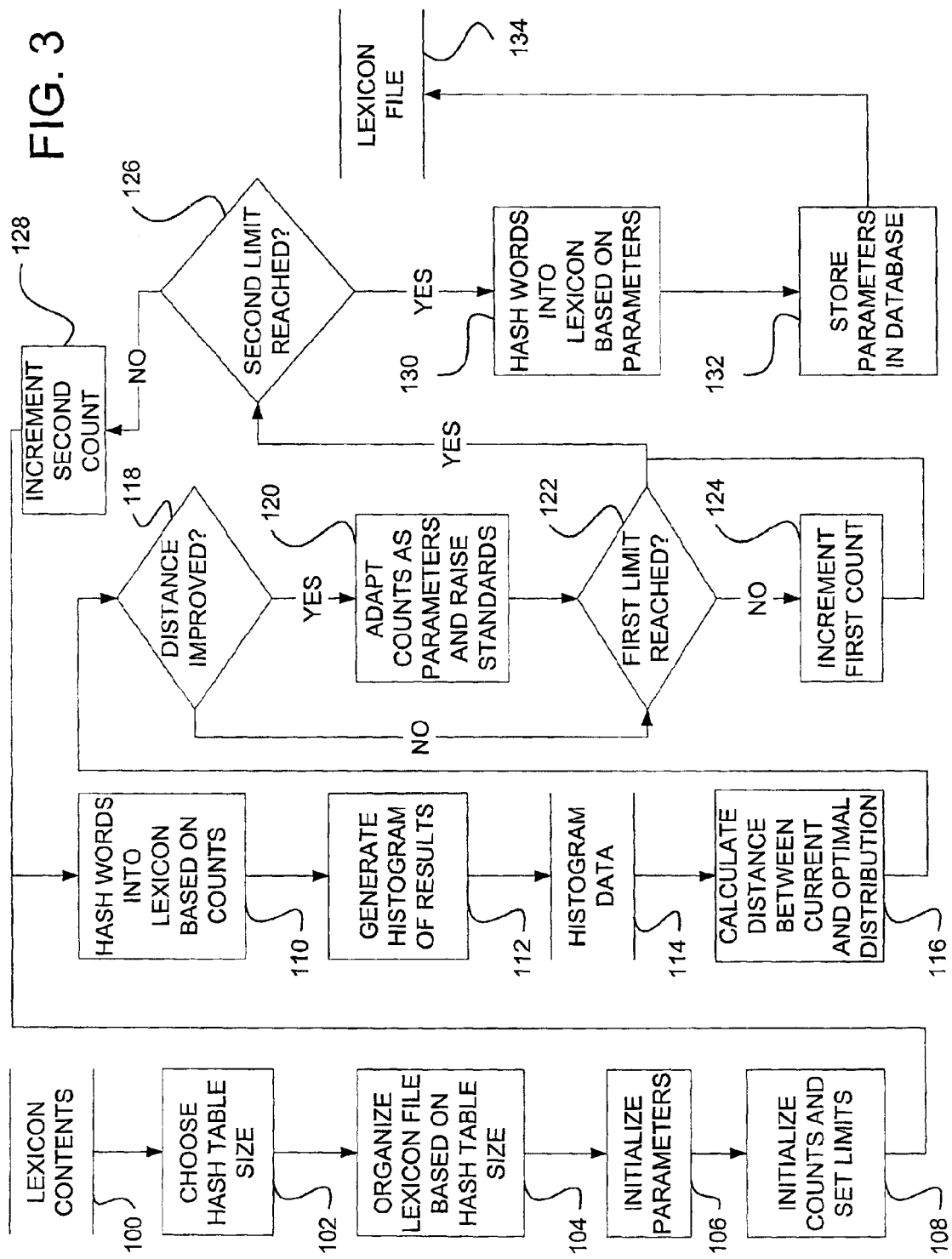
FIG. 3 is a flow chart depicting a method of manufacture for a lexicon file consistent with the present invention.

Referring to FIG. 3, a flowchart depicting a method for constructing a lexicon file consistent with the present invention is shown. Beginning with lexicon file contents 100 equivalent to words of type string with corresponding phoneme data, a hash table size is chosen based on available random access memory at step 102. The lexicon file is organized into word nests of a number equivalent to the size of the hash table at step 104. It may be desirable to base the size of each word nest on a minimum loadable memory size such as a sector or cluster of a disk. As a result the hash table size chosen at step 102 may ideally be equivalent to a number of sectors, etc. required for compressed storage of lexicon file contents 100. Unfortunately, a hash table of sufficient size to provide access to such a lexicon file may exceed the limits of a random access memory. Thus, it is desirable to choose a size of the hash table based on available RAM at step 102 followed by organization of the lexicon file into word nests based on the size of the hash table at step 104. Thus, the size of the nest is preferably based on the minimum loadable memory size and the size of the RAM, where the basis on the minimum loadable memory size may correspond to choosing a multiple of that minimum loadable size.

Once the hash table and lexicon file are organized for construction, it is necessary to initialize first and second parameters at step 106. It is further necessary to initialize first and second counts and set count limits at step 108. Once these preparations have been made, it is possible to hash words into the lexicon file based on the first and second count at step 110. A sample of code for computing a hash value based on the first and second counts, based on the characters present in the string, and based on the length of the string is shown below:

```
#include "hashfunc.h"
//Establish Block Size
#define BLOCK₁₃ SIZE 2
HashValue StringHash(const char* pszWord, uint32 nHashTableSize,
            uint32 nRand1, uint32 nRand2)
{
    //Calculate number of block based on the Block Size, and determine
    string
    //length
    HashValue nRet = 0;
    int nLen    = strlen(pszWord);
    int nBlocks = (nLen + BLOCK_SIZE - 1)/BLOCK_SIZE;
    char chCur;
    //Iterate through the blocks to determine the return value
    for (int iBlock = 0; iBlock < nBlocks; iBlock++) {
        int nLimit = (iBlock + 1 == nBlocks) ?
                nBlocks % BLOCK_SIZE : BLOCK_SIZE;
        //For each block, iterate through the characters
        for (int iByte = 0; iByte < nLimit; iByte++) {
            //Hash the current lower case character from the string
            chCur = tolower(pszWord[iBlock * BLOCK_SIZE + iByte]) +
                    (iBlock + 1) * (nRand1 + 4);
            //Append a hash value for the current character to the return
            value nRet += (1 << iByte * 8) * chCur;
        }
    }
    //Make the length of the string matter for the hash value
    nRet += nLen * nRand2;
    //Make sure the value is in the proper boundary
    [0. . .nHashTableSize - 1]
    return nRet % nHashTableSize;
}
```

Note that, in the code above, the degree to which the returned hash value stems from the characters in the string depends on the first count, whereas the degree to which the returned hash value stems from the length of the string depends on the second count.

Subsequent to hashing of the words into the lexicon file based on the first and second counts at step 110, it may be desirable to generate a histogram of the constructed lexicon file at step 112, thereby resulting in histogram data 114. An example histogram for a constructed lexicon file containing seven-hundred ninety-four words is shown below:

| A | B | C |
|---|---|---|
| 1 | 2 | 2 |
| 3 | 9 | 27 |
| 4 | 6 | 24 |
| 5 | 13 | 65 |
| 6 | 10 | 60 |
| 7 | 9 | 63 |
| 8 | 7 | 56 |
| 9 | 11 | 99 |
| 10 | 10 | 100 |
| 11 | 9 | 99 |
| 12 | 4 | 48 |
| 13 | 5 | 65 |
| 14 | 5 | 70 |
| 16 | 1 | 16 |
| | Total: | 794 |

A = NestSize (in Words)
B = Number of nests with that size
C = A * B

The distance between the current and optimal distribution is calculated at step 116, and step 116 may occur concurrently with step 112. Sample code for accomplishing step 116 is but forth below:

```
//Set the distance large enough
#define INFINITY 10e200
double dblDistance = INFINITY;
//Initialize first and second parameters
int best_r1, best_r2;
//Initialize first and second counts and set count limits
for (int r1 = 0; r1 <255; r1++) {
    for (int r2 = 0; r2 < 255; r2++) {
        //Calculate distance between current and optimal distribution
        double dblNewDistance =
            GetDistanceToTheOptimalDistribution(r1, r2);
        if (dblNewDistance < dblDistance) {
            //If new distance is best so far then record new best parameters and
            best
            //result
            best_r1 = r1;
            best_r2 = r2;
            dblDistance = dblNewDistance;
        }
    }
}
```

Further, the method by which the distance between the current and optimal distribution is put forth below as equation 1:

$$\sqrt{\sum_{i=0}^{W-1} (current_i - ideal_i)^2}$$

W is the number of words, indicating that the calculation is a sum of the distances for each distribution every time a word is hashed into a lexicon. Still further, to facilitate discussion of the preceding code and method, an ideal histogram for a lexicon file of 794 words is put forth below:

| A | B | C = A * B |
|---|---|---|
| 8 | 87 | 696 |
| 7 | 14 | 98 |
| | Total: | 794 |

The histogram above should be interpreted with respect to the histogram below, wherein mathematical relationships for defining an ideal histogram are depicted:

| A | B | C = A * B |
|---|---|---|
| A1 = CEILING(W/H,1) | B1 = W - A2 * H | C1 = A1 * B1 |
| A2 = FLOOR(W/H,1) | B2 = H - B1 | C2 = A2 * B2 |
| | Total: | C1 + C2 = W |

The goal in recursively constructing the lexicon file is to determine the best set of parameters for constructing the lexicon file. Therefore, if the distance is determined to be the smallest one calculated thus far, then the first and second parameters are set equal to the first and second counts at step 120, and the newest, best result is recorded. Depending whether the first count limit has been reached as at 122, the first count is incremented at step 124. Similarly, depending on whether the second count limit has been reached as at 126, a second count is incremented at step 128. Thus, if both count limits have not been reached, then processing continues at step 110 and the lexicon file is populated using each possible combination of parameters. If, however, both count limits have been reached, then processing continues at step 130, where the words are hashed into the lexicon file based on the first and second parameters selected during the trial process. As will readily be appreciated by one skilled in the art, it is necessary to store the first and second parameters with the lexicon file at step 132 to enable access of the file via the same hash function. The resulting lexicon file 134 is consistent with the system and method of the present invention.

Figure 4:
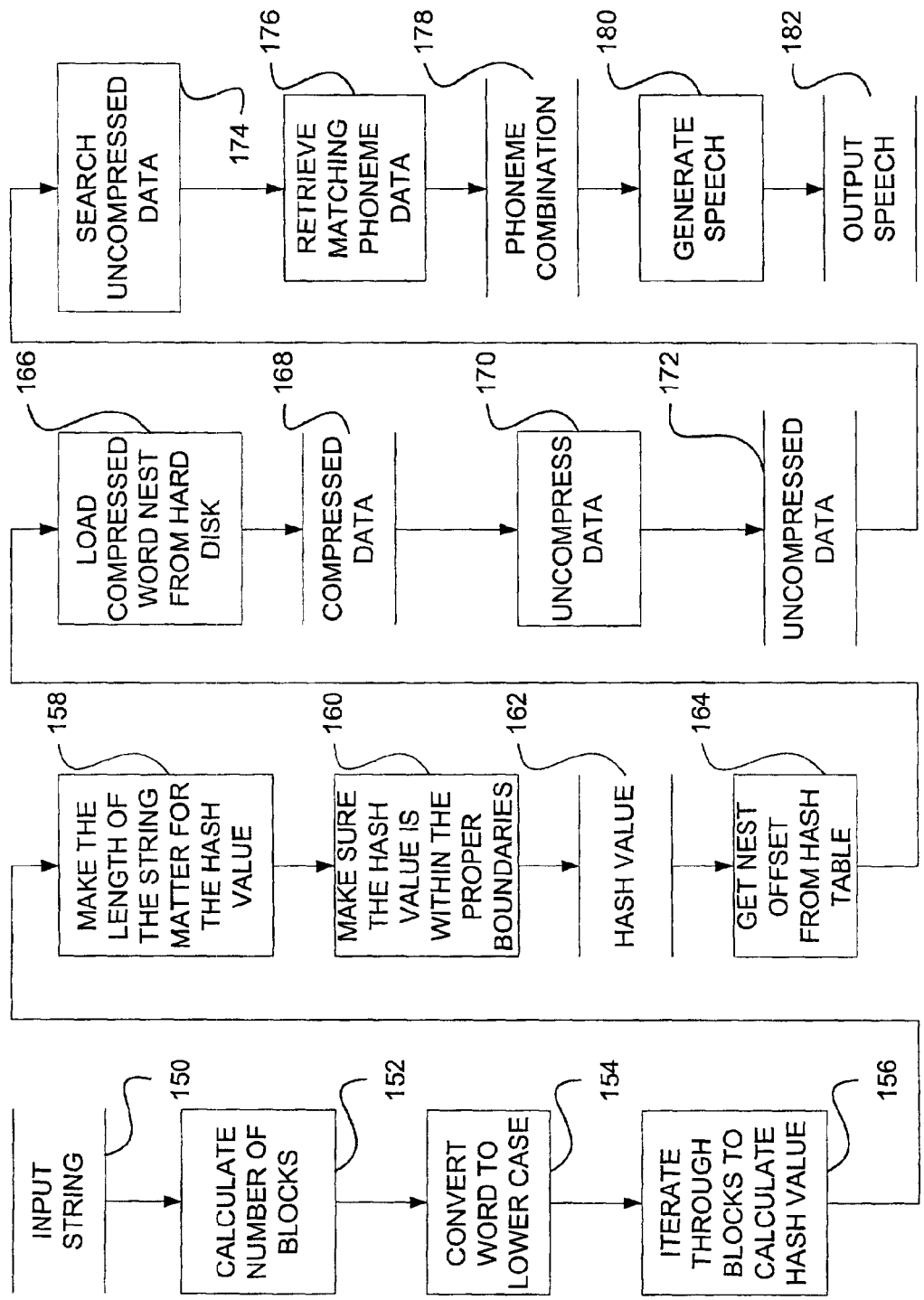
FIG. 4 is a flow chart depicting a method of operation for an implementation of the present invention with a text to speech system.

Referring to FIG. 4, a method of operation for a text to speech system implementing the present invention is shown. Given an input string 150, it is simply necessary to utilize the same hash function for accessing the data file that was used to construct the data file. Thus, a number of blocks based on a block size is calculated at step 152 and the word is converted to lower case at step 154 for a case insensitive search. Further in accordance with the hash value calculation, the blocks are iterated through to calculate the hash value based on the first parameter at step 156. Further, the length of the string is made to matter for the hash value based on the second parameter at step 158. Finally, in making sure that the hash value is within the proper boundaries at step 160, a hash value 162 results.

Getting the nest offset from the hash table at step 164 is a simple look up function, and the nest offset value may be utilized to load a corresponding compressed word nest from disk at step 166. The resulting compressed data 168 residing in the random access memory is uncompressed at step 170, resulting in uncompressed data 172 suitable for search. It is thus a simple matter to search the uncompressed data at step 174 using searching and/or sorting algorithms well known in the art. Hence, matching phoneme data is retrieved at step 166 and the resulting phoneme combination 178 is used to generate speech based on phoneme data at step 180. Thus, input string 150 is converted to output speech 182 utilizing the system and method of the present invention.

As may readily be appreciated by one skilled in the art, it may also be desirable to compress the input string 150, to refrain from compressing the compressed data 168, and to search the compressed data 168 with the compressed input string. Further variations consistent with the present invention will also be readily apparent to one skilled in the art. The description of the invention is merely exemplary in nature and notes variations that do not depart from the gist of the invention are intended to be within the scope of the invention. Such variations are not being regarded as a departure from this spirit and scope of the invention.

What is claimed is:

1. A data retrieval system for use with a data processing system, the system comprising:

a first memory;

a second memory accessible to said first memory;

a data file residing in said second memory, said data file containing stored data organized into nests;

a data structure residing in said first memory, said data structure designed to occupy a fixed amount of memory independent of content of said data file, said data structure organized according to hash values produced by a hash function for retrieving items in said data file, the hash values having associated offset values for accessing a nest of said data file; and a data retrieval module in communication with said first memory, said data retrieval module operable to instantiate the hash function, to calculate a hash value based on input data, and to make an identification regarding a corresponding nest of the data file via said data structure, the identification based on the associated offset value of the hash value, wherein the hash function is based at least in part on parameters selected according to characteristics of the data file, wherein the hash function is further designed to be optimized for content of said data file, and wherein the hash function is further designed to produce hash values based on the fixed amount of memory.

2. The system of claim 1, wherein said data retrieval module is further operable to load the corresponding nest from the second memory to the first memory, thereby resulting in a loaded corresponding nest residing within said first memory.

3. The system of claim 1, wherein said data retrieval module is further operable to search the corresponding nest of said data file for stored data matching the input data, and to retrieve the stored data.

4. The system of claim 2, wherein said data module is further operable to search the loaded corresponding nest for stored data matching the input data, and to retrieve the stored data.

5. The system of claim 4, wherein said first memory is a random access memory and said second memory is a disk memory.

6. The system of claim 1, wherein said stored data is compressed data, and wherein said data retrieval module is further operable to decompress the compressed data.

7. The system of claim 1, wherein said data structure has a data structure size based on a memory size of the first memory, and wherein said data file is organized into word nests of a number based on the data structure size.

8. The system of claim 1, wherein said data file has stored parameters, and wherein said data retrieval module calculates the hash value based on the stored parameters.

9. The system of claim 1, wherein said input data is a word of type string, and wherein said data retrieval module calculates the hash value based on at least one of characters parsed from the word and length of the word.

10. The system of claim 1, wherein the input data are further defined as a word of type string, and wherein the stored data are further defined as sound units for transcribing words of type string into audible speech, the sound units having associated words of type string.

11. The system of claim 10, wherein the sound units are further defined as phoneme combinations.

12. The system of claim 10, wherein the hash value is calculated based on character combinations parsed from the word of type string.

13. The system of claim 10, wherein the data file is encoded according to characters capable of being parsed from words of type string.

14. A method of constructing a data file for use with a data retrieval system of a data processing system, the data processing system having a first memory and a second memory, the method comprising:

choosing a data structure size for a data structure based on a memory size of the first memory;

organizing the data file into a number of nests based on the data structure size;

populating the data file with data based on a hash function and a plurality of parameters; and storing said plurality of parameters within the data file.

15. The method of claim 14, the method further comprising:

repeatedly populating said data file with the data based on the hash function and the plurality of parameters;

varying the combination of parameters each time the data file is populated;

making an evaluation regarding a distribution of the data within the data file each time the data file is populated;

choosing a combination of parameters based on the evaluation; and populating the data file with the data based on the combination of parameters, wherein the plurality of parameters stored within the data file correspond to the combination of parameters.

16. The method of claim 14, wherein the data file is further defined as a lexicon database, wherein the data are further defined as sound units for transcribing words of type string into audible speech, the sound units having associated words of type string.

17. The method of claim 16, wherein the sound units are further defined as phoneme combinations.

18. The method of claim 16, wherein the hash function calculates a hash value based on character combinations parsed from the words of type string.

19. The method of claim 14, wherein the data file is encoded according to characters capable of being parsed from words of type string.

20. A data file manufactured according to the method of claim 14, the data file residing in memory operable with a data processing system.

21. A method of retrieving stored data based on input data for use with a data retrieval system of a data processing system, the method comprising:

receiving input data;

computing a hash value based on the input data;

determining an offset value based on the hash value, the offset value indicating a nest of a data file containing stored data, the data file organized into nests, the data file residing in a second memory accessible to said data processing system.

22. The method of claim 21, the method further comprising:

loading the nest from said second memory to a first memory accessible to said data processing system, resulting in a loaded nest within the first memory;

searching the loaded nest for matching stored data based on the input data; and retrieving the matching stored data.

23. The method of claim 21, the method further comprising:

searching the nest for matching stored data based on the input data; and retrieving the matching stored data.

24. The method of claim 21, wherein the first memory is a random access memory, and wherein the second memory is a disk memory.

25. The method of claim 22, wherein the stored data is compressed, the method further comprising:

decompressing the loaded nest within the first memory, resulting in a decompressed nest within the first memory, and wherein said searching occurs within the decompressed nest.

26. The method of claim 21, wherein the input data are further defined as words of type string, and wherein the stored data are further defined as phoneme combinations for transcribing words of type string into audible speech, the phoneme combinations having associated words of type string.

27. The method of claim 21, wherein the hash value is calculated based on character combinations parsed from the word of type string.

28. The method of claim 21, wherein the data file is encoded according to characters capable of being parsed from words of type string.

29. The method of claim 21, wherein the data file has stored pluralities generated during construction of the data file, and wherein the hash value is calculated based on the stored parameters.

30. A transcription database system for use with a computerized transcription system implemented via a data processing system, the system comprising:

a random access memory accessible to said data processing system;

a disk memory accessible to said data processing system;

a lexicon file residing in said disk memory, said lexicon file containing compressed data corresponding to phoneme combinations for transcribing words of type string into audible speech, the phoneme combinations having associated words of type string, said lexicon file containing a stored combination of parameters generated during manufacture of said lexicon file;

a hash table residing in said random access memory, said hash table having a hash table size based on a memory size of said random access memory, said hash table organized according to hash values having associated offset values for accessing word nests of said lexicon file, said lexicon file organized into a number of word nests based on the hash table size; and a data retrieval module in communication with said first memory, said data retrieval module operable to calculate a hash value for an input word of type string based on the stored combination of parameters, character combinations parsed from the input word, and a length of the input word, access a word nest of said lexicon file via said hash table, load the word nest into said random access memory, decompress the word nest, search the word nest for a word of type string matching the input word, and retrieve the phoneme combination associated with the word of type string.

* * * * *